(12) United States Patent
Sugimoto et al.

(10) Patent No.: US 6,483,246 B2
(45) Date of Patent: Nov. 19, 2002

(54) DIRECTION-INDICATION-LAMP CONTROL APPARATUS FOR VEHICLE

(75) Inventors: Shigekazu Sugimoto, Takahama (JP); Yoshichika Abe, Anjo (JP); Hiroshi Yagyu, Tsushima (JP)

(73) Assignees: Anden Co., Ltd., Anjo (JP); Denso Corporation, Kariya (JP)

( * ) Notice: Subject to any disclaimer, the term of this patent is extended or adjusted under 35 U.S.C. 154(b) by 0 days.

(21) Appl. No.: 09/897,017

(22) Filed: Jul. 3, 2001

(65) Prior Publication Data

US 2002/0047531 A1 Apr. 25, 2002

(30) Foreign Application Priority Data

Jul. 4, 2000 (JP) ........................................ 2000-202632

(51) Int. Cl.$^7$ ................................................ B60Q 1/02
(52) U.S. Cl. ........................................ 315/82; 307/10.8
(58) Field of Search ............................ 315/82, 83, 86; 307/10.8

(56) References Cited

U.S. PATENT DOCUMENTS

| | | | |
|---|---|---|---|
| 4,723,095 A | | 2/1988 | Svazas et al. ................. 315/82 |
| 5,245,251 A | * | 9/1993 | Irick ........................ 307/10.8 |
| 5,966,073 A | * | 10/1999 | Walton ....................... 340/468 |
| 6,262,537 B1 | * | 7/2001 | Matsumoto .................. 315/82 |
| 6,417,623 B1 | * | 7/2002 | Chamberlain et al. ........ 315/82 |

FOREIGN PATENT DOCUMENTS

| | | |
|---|---|---|
| JP | 5-29947 | 7/1993 |
| JP | A-5-29948 | 7/1993 |

OTHER PUBLICATIONS

GM Corp., 1999 Chevrolet Venture, Pontiac Trans Sport, Pontiac Montana, and Oldsmobile Silhouette Service Manual, vol. 2, Mar. 1999, pp. 8–180—8–183.
GM Corp., 2000 Chevrolet Montana (Export Only), Chevrolet Venture, Pontiac Montana, and Oldsmobile Silhouette Service Manual, vol. 2, Dec. 1999, pp. 8–188—8–193.

* cited by examiner

Primary Examiner—Don Wong
Assistant Examiner—Ephrem Alemu
(74) Attorney, Agent, or Firm—Law Offices of David G. Posz

(57) ABSTRACT

Left and right turn lamps are used as lamps in a daytime travel of a vehicle. When a first daytime turn-on requirement is satisfied, i.e., when an ignition switch is ON, a left-hand contact of a turn switch is OFF, a right-hand contact thereof is off, and the like, a left front turn lamp and a right front turn lamp are turned on as the lamps in the daytime travel, based on signals outputted from first and second AND logic circuits. When the left-hand contact of the turn switch is turned on in this state, the left front turn lamp flashes, based on a signal outputted from a flasher circuit, whereas the right front turn lamp keeps a turn-on state. On the other hand, when the right-hand contact of the turn switch is turned on, the right front-turn lamp flashes, based on a signal outputted from the flasher circuit, whereas the left front turn lamp keeps a turn-on state.

9 Claims, 6 Drawing Sheets

DIRECTION-INDICATION-LAMP CONTROL APPARATUS FOR VEHICLE

The present invention relates to a direction-indication-lamp control apparatus for a vehicle for turning on a turn lamp disposed at each of the left-hand and right-hand sides of the vehicle as a lamp in a daytime travel.

There are various proposals made to enhance safety of the vehicle by illuminating the space in front of the vehicle in the daytime travel. In this case, when a head lamp of the vehicle is used as the lamp in the daytime travel, it is necessary to provide the vehicle with means for reducing the luminous intensity of the head lamp, because the head lamp is too bright in the daytime. As the known luminous intensity reduction means, the following means are hitherto used: the head lamp is lighted by PWM (pulse width) control. As another example, right and left head lamps are connected in series to each other. As still another example, a resistance is connected in series to the head lamps.

On the other hand, the luminous intensity reduction means is not required in the case where turn lamps disposed at the left-hand and right-hand sides of the vehicle are used as the lamp in the daytime travel. Direction-indication-lamp control apparatuses for a vehicle using the turn lamp used as the lamp in the daytime travel are disclosed in the specification of Japanese Utility Model Publications Nos. 5-29947 and 5-29948.

FIG. 6 schematically shows the construction of the direction-indication-lamp control apparatus for a vehicle disclosed in Japanese Utility Model Publication No. 5-29947. In the direction-indication-lamp control apparatus, when the ignition switch 101 is turned on, an electric power is supplied to the turn lamps 105, 106 from the battery 102 through the relays 103, 104 respectively to turn on the turn lamps 105, 106.

When the turn switches 107, 108 are switched to the left (the side at which the left-hand turn lamp 105 flashes on and off) or the right (the side at which the right-hand turn lamp 106 flashes on and off) or when the hazard switches 109, 110 are switched to turn them on, the daylight cancellation portion 111 actuates the relays 103, 104 to switch the contact. At this time, the flasher portion 112 outputs a flashing-signal to flash the corresponding turn lamp.

The construction allows the turn lamp disposed at the left-hand and right-hand sides of the vehicle to serve as the lamp in the daytime travel when the ignition switch is ON.

The direction-indication-lamp control apparatus for a vehicle disclosed in Japanese Utility Model Publication No. 5-29948 has the flash detection means for detecting a flashing signal outputted from the flasher portion 112, instead of the daylight cancellation portion 111 to switch the contact of the relays 103, 104, based on an output of the flash detection-means.

According to the control apparatus disclosed in the specification of U.S. Pat. No. 4,723,095, the turn lamp disposed at each of the left-hand and right-hand sides of the vehicle is turned on as the lamp for the daytime travel when the ignition switch is turned on.

In the art of any of the above-described publications, when the turn switch is switched to the left or the right in the state where the turn lamp disposed at each of the left-hand side and the right-hand side of the vehicle is turned on as the lamp in the daytime travel, one of the turn lamps flashes on and off in correspondence to the switching operation, and the other turn lamp is turned off.

It is preferable to keep the turn lamps lighting as the lamp in the daytime travel. Therefore, it is not preferable that the switching operation of the turn switch causes one of the turn lamps to be turned off.

SUMMARY OF THE INVENTION

It is an object of the present invention to use left-hand and right-hand turn lamps as lamps in a daytime travel of a vehicle and. flash one of the turn lamps corresponding to an operation of a turn switch and keep the other turn lamp turned on.

According to the direction-indication-lamp control apparatus of the present invention, when a requirement of a daytime travel is satisfied and a requirement of flashing a left-hand turn lamp and a requirement of flashing a right-hand turn lamp are not satisfied, the left-hand turn lamp and the right-hand turn lamp are turned on as the lamps in the daytime travel. When a left contact of a turn switch is turned on in this sate, the requirement of flashing the left-hand turn lamp is satisfied. Thus the state of the left-hand turn lamp changes from the turn-on state to a flashing state, whereas the right-hand turn lamp continues the turn-on state. On the other hand, when a right contact of the turn switch is turned on, the requirement of flashing the right-hand turn lamp is satisfied. Thus the state of the right-hand turn lamp changes from the on-state to the flashing state, whereas the left-hand turn lamp continues the turn-on state. In this manner, it is possible to flash one of the left-hand and right-hand turn lamps and keep the other turn lamp turned on in correspondence to a switching operation of the turn switch to the left or the right by separately determining the requirement of flashing the left-hand turn lamp and the requirement of flashing the right-hand turn lamp and then turning on/flashing the left-hand turn lamp and the right-hand turn lamp independently.

The signal indicating the requirement of the daytime travel includes a signal outputted from an ignition switch and a signal outputted from a head lamp switch. The signal indicating the requirement of flashing the left-hand turn lamps includes a signal outputted from the turn switch turned to the left and a signal outputted from a hazard switch. The signal indicating the requirement of flashing the right-hand turn lamps includes a signal outputted from the turn switch turned to the right and a signal outputted from the hazard switch.

First through fourth relay means are used to turn on/flash the left-hand turn lamp and the right-hand turn lamp. Each of the third and fourth relay means can be constituted of a relay means of make-and-break type. In this case, at most, two relay means are operated to turn on/flash the left-hand turn lamp and the right-hand turn lamp. Thus it is possible to reduce the quantity of heat generated by the operation of the relay means.

It is possible to use four relay means of the same type (for example, one-make type) to turn on/flash the left-hand turn lamp and the right-hand turn lamp.

DETAILED DESCRIPTION OF THE PREFERRED EMBODIMENTS

The embodiments of the present invention will be described below with reference to drawings.

First Embodiment

Figure 1:
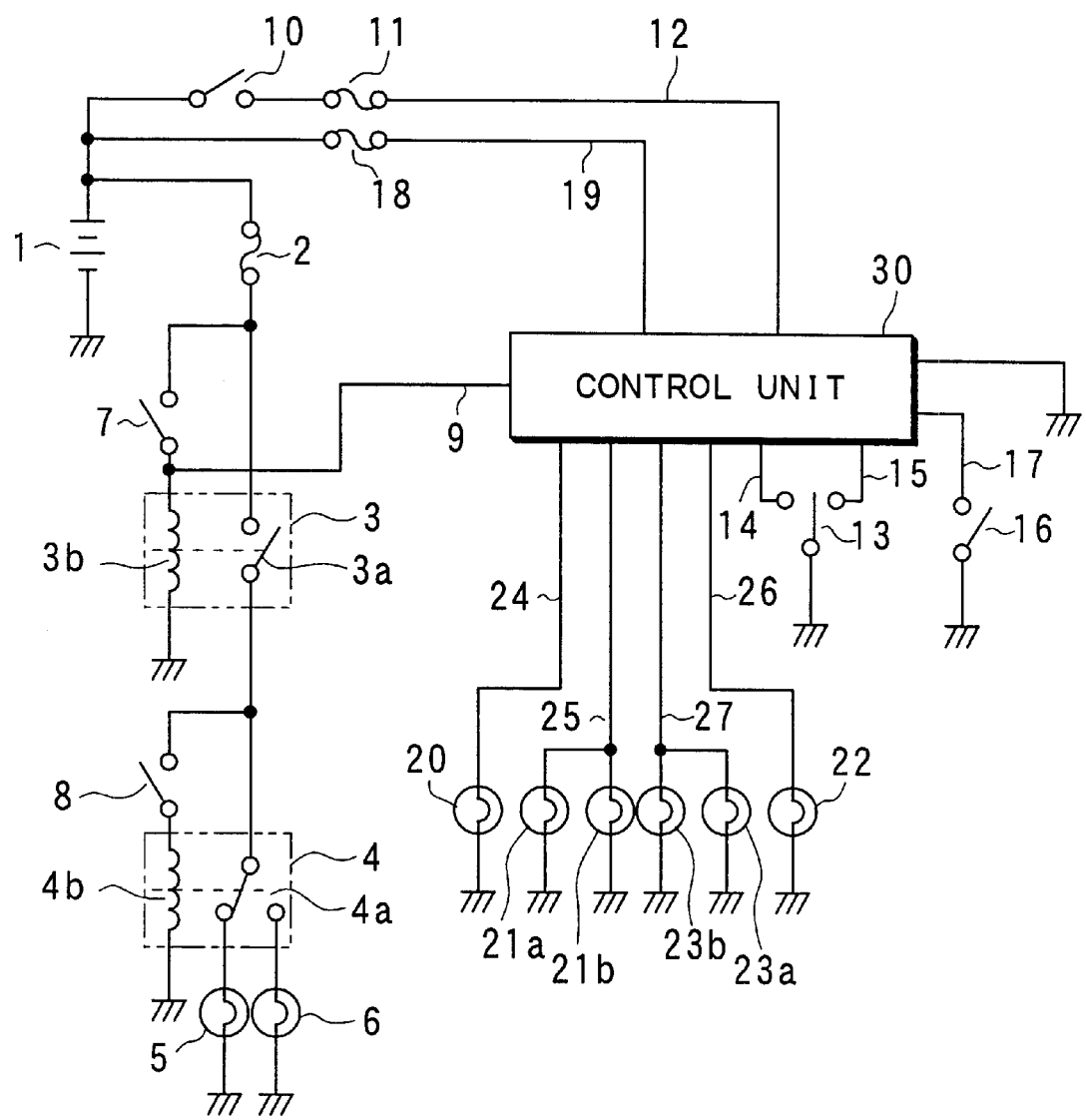
FIG. 1 shows the entire construction of a first embodiment of the direction-indication-lamp control apparatus for a vehicle of the present invention.

FIG. 1 shows a first embodiment of a direction-indication-lamp control apparatus for a vehicle of the present invention. The positive electrode of a battery 1 is connected in series with a fuse 2, a relay switch 3a of a head-lamp relay 3, and a relay switch 4a of a dimmer relay 4. A low-beam head lamp 5 is connected to a normally closed side of the relay switch 4a. A high-beam head lamp 6 is connected to a normally open side of the relay switch 4a. A series circuit of a head lamp switch 7 and a relay coil 3b of the head-lamp relay 3 is connectedly disposed between the secondary side of the fuse 2 and the ground. A series circuit of a dimmer switch 8 and a relay coil 4b of the dimmer relay 4 is connectedly disposed between the secondary side of the relay switch 3a and the ground.

The contact point between the head lamp switch 7 and the relay coil 3b is connected to a control unit 30 with an electric wire 9. The control unit 30 is connected to an electric wire 12 extending from the positive electrode of the battery 1 via an ignition switch 10 and a fuse 11; electric wires 14, 15 extending from a turn switch 13; an electric wire 17 extending from a hazard switch 16; and an electric wire 19 extending from the positive electrode of the battery 1 via a fuse 18.

The control unit 30 is connected to a left front turn lamp 20 disposed at the left front of a vehicle via an electric wire 24; left rear turn lamps (two in the first embodiment) 21a, 21b disposed at the left rear thereof via an electric wire 25; a right front turn lamp 22 disposed at the right front thereof via an electric wire 26; and right rear turn lamps (two in the first embodiment) 23a, 23b disposed at the right rear thereof via an-electric wire 27.

The control unit 30 executes control for flashing the turn lamps 20–23, according to a (switching) operation of the turn switch 13 and the hazard switch 16. The control unit 30 also executes control of turning on and off the left front turn lamp 20 and the right front turn lamp 22, if a daytime turn-on requirement is satisfied, i.e., if the ignition switch 10 is ON, the turn switch 13 is OFF (at neutral position), the hazard switch 16 is OFF, and the head lamp switch 7 is OFF.

Figure 2:
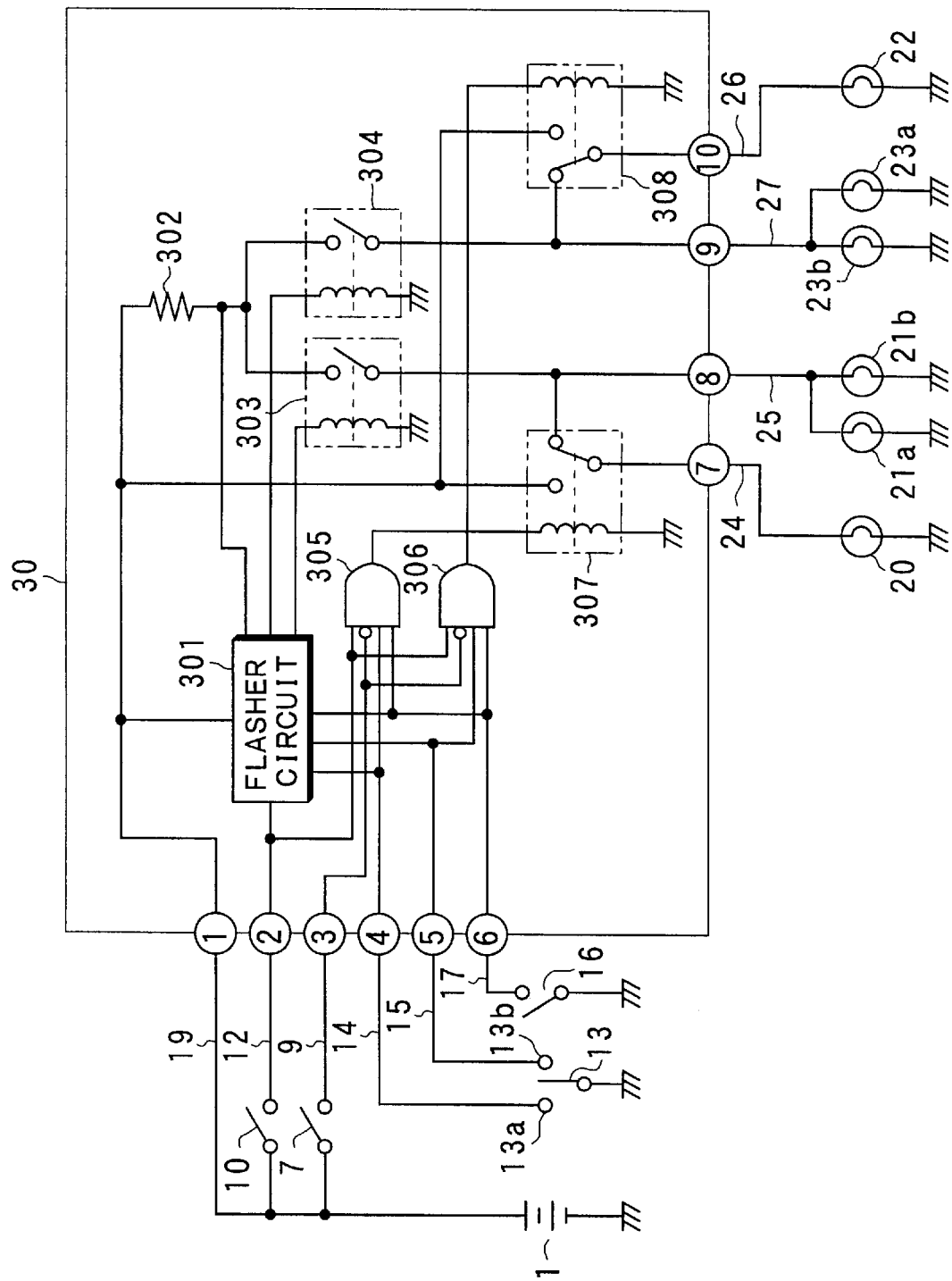
FIG. 2 shows the detailed construction of a control unit 30 shown in FIG. 1.

FIG. 2 shows the detailed construction of the control unit 30. FIG. 2 shows none of the fuses 2, 11, and 18; the head-lamp relay 3; the dimmer relay 4; the head-lamps 5, 6; and the dimmer switch 8 all shown in FIG. 1.

The control unit 30 has connector terminals 1–10. The connector terminal 1 is connected to the electric wire 19 extending from the battery 1. The connector terminal 2 is connected to the electric wire 12 extending from the ignition switch 10. The connector terminal 3 is connected to the electric wire 9 extending from the head-lamp switch 7. The connector terminal 4 is connected to the electric wire 14 extending from the left-hand contact 13a of the turn switch 13. The connector terminal 5 is connected to the electric wire 15 extending from the right-hand contact 13b of the turn switch 13. The connector terminal 6 is connected to the electric wire 17 extending from the hazard switch 16. The connector terminal 7 is connected to the electric wire 24 extending to the left front turn lamp 20. The connector terminal 8 is connected to the electric wire 25 extending to the left rear turn lamps 21a, 21b. The connector terminal 9 is connected to the electric wire 26 extending to the right front turn lamp 22. The connector terminal 10 is connected to the electric wire 26 extending to the right rear turn lamps 23a, 23b.

The control unit 30 includes a flasher circuit 301; a current detection resistance 302; one-make type first and second M relays 303, 304; first and second AND logic circuits 305, 306; and make-and-break type first and second MB relays 307, 308.

The flasher circuit 301 outputs signals for flashing the turn lamps 20–23 to the first and second M relays 303, 304, according to a (switching) operation of the turn switch 13 and the hazard switch 16. More specifically, when the left-hand contact 13a is closed by operating the turn switch 13 to the left, the flasher circuit 301 outputs a left-hand turn lamp flashing signal (signal for operating the first M relay 303 intermittently) to the first M relay 303. When the right-hand contact 13b is closed by operating the turn switch 13 to the right, the flasher circuit 301 outputs a right-hand turn lamp flashing signal (signal for operating the second M relay 304 intermittently) to the second M relay 304. When a turn-on operation of the hazard switch 16 is executed, the flasher circuit 301 outputs the left-hand turn lamp flashing signal and the right-hand turn lamp flashing signal to the first and secondM relays 303, 304 respectively. The flasher circuit 301 has a function of detecting a disconnection of the turn lamps 20–23, based on a voltage of the current detection resistance 302.

The first AND logic circuit 305 outputs a left-hand turn lamp turn-on signal for turning on the left front turn lamp 20, when a first daytime turn-on requirement is satisfied, i.e., when it is determined that the ignition switch 10 is ON, the head lamp switch 7 is OFF, the left-hand contact 13a of the turn switch 13 is OFF (i.e., the turn switch 13 turned to the left is OFF), and the hazard switch 16 is OFF, based on a signal outputted from the ignition switch 10, a signal outputted from the head lamp switch 7, a signal outputted from the left-hand contact 13a of the turn switch 13, and a signal outputted from the hazard switch 16. Even when the signal outputted from the ignition switch 10 is ON, the left-hand turn lamp turn-on signal is not outputted from the first AND logic circuit 305, when any one of the head lamp switch 7, the left-hand contact 13a of the turn switch 13, and the hazard switch 16 is ON.

The second AND logic circuit 306 outputs a right-hand turn lamp turn-on signal for turning on the right front turn lamp 22, when a second daytime turn-on requirement is satisfied, i.e., when it is determined that the ignition switch 10 is ON, the head lamp switch 7 is OFF, the right-hand contact 13b of the turn switch 13 is OFF (i.e., the turn switch 13 turned to the right is OFF), and the hazard switch 16 is OFF, based on a signal outputted from the ignition switch 10, a signal outputted from the head lamp switch 7, a signal outputted from the right-hand contact 13b of the turn switch 13, and a signal outputted from the hazard switch 16. Even when the signal outputted from the ignition switch 10 is ON, the right-hand turn lamp turn-on signal is not outputted from the second AND logic circuit 306, when any one of the head lamp switch 7, the right-hand contact 13b of the turn switch 13, and the hazard switch 16 is ON.

The first MB relay 307 operates to connect a common contact thereof to a normally open contact (make contact)

when the left-hand turn lamp turn-on signal is outputted from the first AND logic circuit 305. On the other hand, the first MB relay 307 operates to connect the common contact to a break contact (normally closed contact) thereof when the left-hand turn lamp turn-on signal is not outputted from the first AND logic circuit 305. Similarly, the second MB relay 308 operates to connect a common contact thereof to a make contact thereof when the right-hand turn lamp turn-on signal is outputted from the second AND logic circuit 306. On the other hand, the second MB relay 308 operates to connect the common contact to a break contact thereof when the right-hand turn lamp turn-on signal is not outputted from the second AND logic circuit 306.

The operation of the direction-indication-lamp control apparatus having the above-described construction will be described below.

Let it be supposed that the ignition switch 10 is turned on, upon start of the vehicle. When the head lamp switch 7 is OFF, the turn switch 13 is at the neutral position and thus both the left-hand contact 13a and the right-hand contact 13b are OFF, and the hazard switch 16 is OFF, the left-hand turn lamp turn-on signal and the right-hand turn lamp turn-on signal are outputted from the first and second AND logic circuits 305 and 306 respectively. The first and second MB relays 307 and 308 operate to connect the common contact to the make contact, based on the left-hand turn lamp turn-on signal and the right-hand turn lamp turn-on signal respectively. As a result, an electric power is supplied to the left front turn lamp 20 and the right front turn lamp 22 from the electric wire 19 through the first and second MB relays 307 and 308 respectively to turn on the left front turn lamp 20 and the right front turn lamp 22.

Accordingly, during the daytime travel, the left front turn lamp 20 and the right front turn lamp 22 keep a turn-on state respectively. Therefore it is possible to improve safety of the vehicle in the daytime travel.

When the left-hand contact 13a is turned on by operating the turn switch 13 to the left in the daytime travel, the left-hand turn lamp turn-on signal is not outputted from the first AND logic circuit 305. Consequently, the common terminal of the first MB relay 307 is connected to the break contact thereof. The left-hand turn lamp flashing signal is outputted from the flasher circuit 301 to the first M relay 303 to flash the make contact of the first M relay 303 at predetermined intervals. Thereby the left front turn lamp 20 and the left rear turn lamps 21a, 21b flash on and off. At this time, because the right-hand turn lamp turn-on signal is outputted continuously from the second AND logic circuit 306, the right front turn lamp 22 keeps the turn-on state.

When the right-hand contact 13b is turned on by operating the turn switch 13 to the right in the daytime travel, the right-hand turn lamp turn-on signal is not outputted from the second AND logic circuit 306. Consequently, the common terminal of the second MB relay 308 is connected to the break contact thereof. The right-hand turn lamp flashing signal is outputted from the flasher circuit 301 to the second M relay 304 to flash the make contact of the second M relay 304 at predetermined intervals. Thereby the right front turn lamp 20 and the right rear turn lamps 23a, 23b flash on and off. At this time, because the right-hand turn lamp flashing signal is outputted continuously from the first AND logic circuit 305, the left front turn lamp 20 keeps the turn-on state.

When a turn-on operation of the hazard switch 16 is executed, the left-hand turn lamp turn-on signal and the right-hand turn lamp turn-on signal are not outputted from the first and second AND logic circuits 305 and 306 respectively. Consequently, the common terminal of the first MB relay 307 and that of the second MB relay 308 are connected to the break contact thereof respectively. The left-hand turn lamp flashing signal and the right-hand turn lamp flashing signal are outputted from the flasher circuit 301 to the first and secondM relays 303 and 304 respectively. Thereby the left-hand turn lamps 20, 21a, and 21b and the right-hand turn lamps 22, 23a, and 23b flash on and off respectively.

When a turn-on operation of the head lamp switch 7 is executed, the left-hand turn lamp turn-on signal and the right-hand turn lamp turn-on signal are not outputted from the first and second AND logic circuits 305 and 306 respectively. Thus the common terminal of the first MB relay 307 and that of the second MB relay 308 are connected to the break contact thereof respectively. Consequently, the left front turn lamp 20 and the right front turn lamp 22 are turned off respectively. That is, when the head lamp switch 7 is turned on, daytime lighting is not required. Thus the left front turn lamp 20 and the right front turn lamp 22 are turned off.

The construction of the first and second AND logic circuits 305 and 306 is described below. Because the construction of the first AND logic circuit 305 is the same as that of the second AND logic circuit 306, only the construction of the first AND logic circuit 305 is described below.

Figure 3:
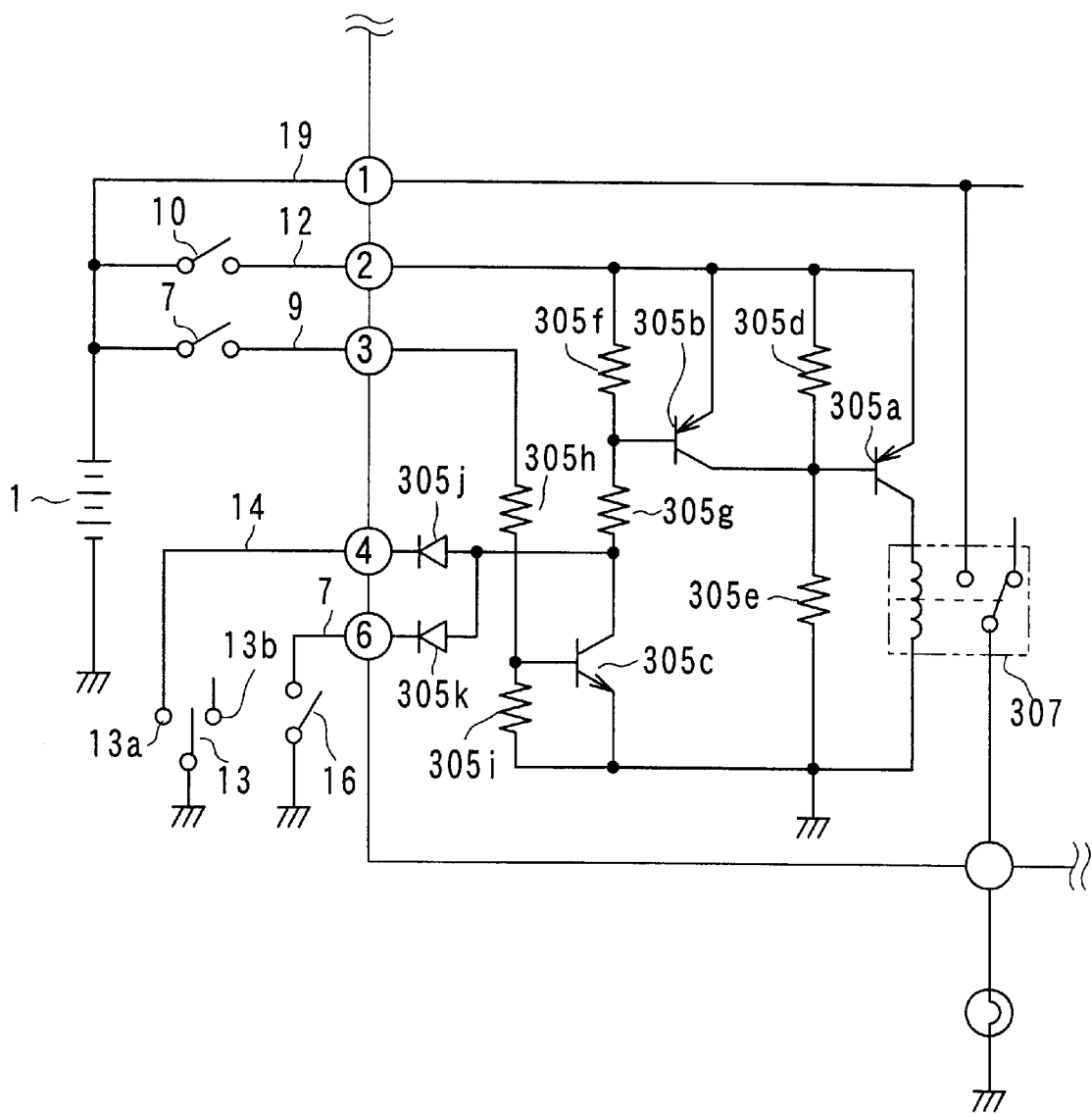
FIG. 3 shows the detailed construction of a first AND logic circuit 305 shown in FIG. 2.

As shown in FIG. 3, the first AND logic circuit 305 includes PNP transistors 305a, 305b; an NPN transistor 305c; resistances 305d–305I; and diodes 305j, 305k. When the head lamp switch 7 is OFF, the left-hand contact 13a of the turn switch 13 is OFF, and the hazard switch 16 is OFF in the state where the ignition switch 10 is in an on-state, the NPN transistor 305c is turned off, the PNP transistor 305b is turned off, the PNP transistor 305a is turned on. As a result, the left-hand turn lamp turn-on signal is outputted to the first MB relay 307.

When any one of the head lamp switch 7, the left-hand contact 13a of the turn switch 13, and the hazard switch 16 is turned on in this state, the PNP transistor 305b is turned on, and the PNP transistor 305a is turned off. As a result, the left-hand turn lamp turn-on signal is not outputted to the first MB relay 307.

Second Embodiment

Figure 4:
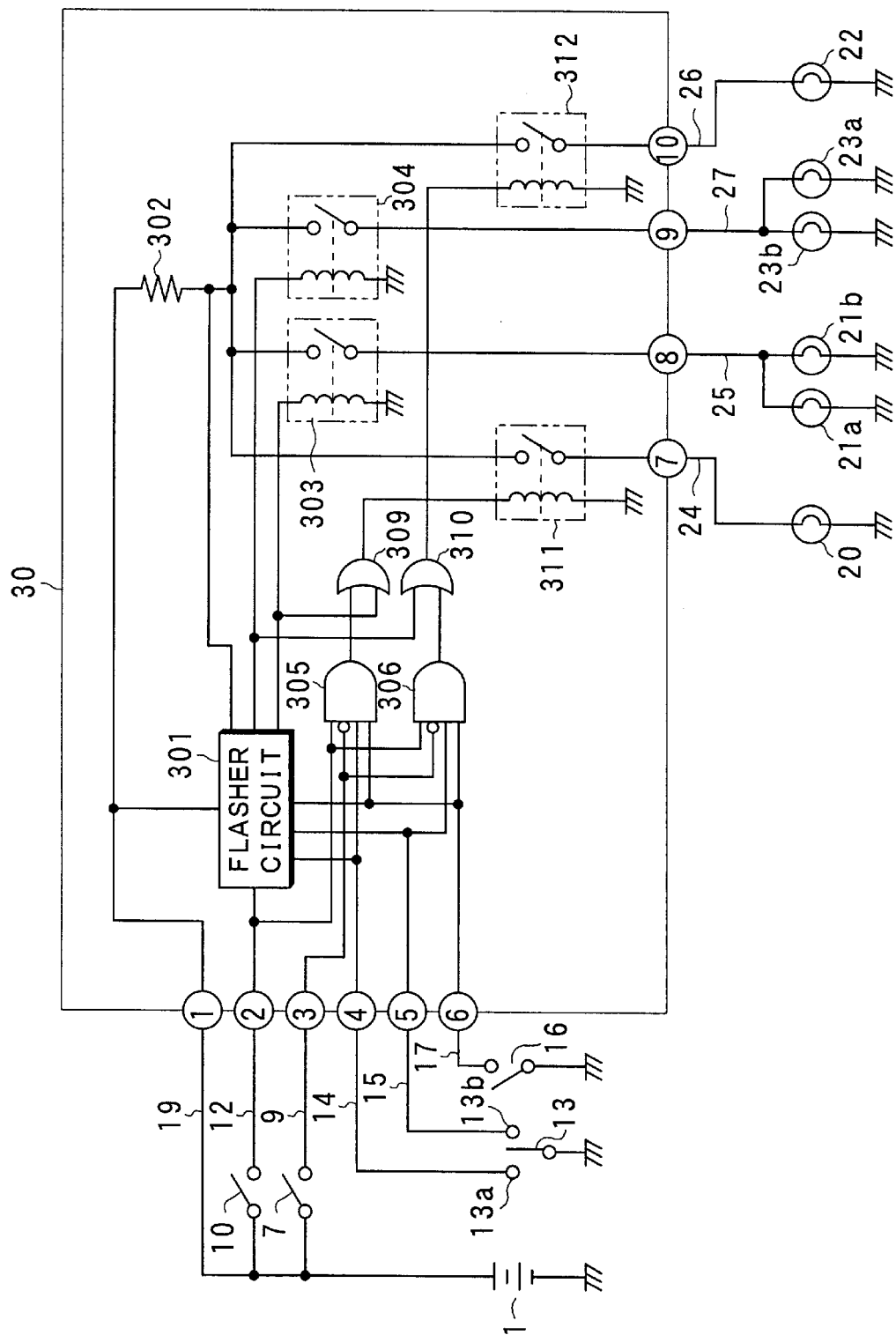
FIG. 4 shows the detailed construction of a control unit 30 of a second embodiment of the present invention.

In the first embodiment, the left front turn lamp 20 and the right front turn lamp 22 are turned on in the daytime travel by using the relay of the make-and-break type. But the control unit may be constructed by using a relay of one-make type instead of the make-and-break type. FIG. 4 shows the construction of the control unit of the second embodiment.

In the construction shown in FIG. 4, an output of the first AND logic circuit 305 and that of the second AND logic circuit 306 are inputted to first and second OR logic circuits 309, 310 respectively. A signal outputted from the flasher circuit 301 to the first M relay 303 is inputted to the first OR logic circuit 309. A signal outputted from the flasher circuit 301 to the second M relay 304 is inputted to the second OR logic circuit 310. A third M relay 311 of the one-make type operates, based on an output signal of the first OR logic circuit 309. A fourth M relay 312 of the one-make type operates, based on an output signal of the second OR logic circuit 310.

In this construction, when the left-hand turn lamp turn-on signal is outputted from the first AND logic circuit 305, the left-hand turn lamp turn-on signal is inputted to the third M relay 311 via the first OR logic circuit 309. Thereby the make contact of the third M relay 311 is closed, and the left front turn lamp 20 is turned on. Similarly, when the right-hand turn lamp turn-on signal is outputted from the second AND logic circuit 306, the right-hand turn lamp turn-on signal is outputted to the fourth M relay 312 via the second OR logic circuit 310. Thereby the make contact of the fourth M relay 312 is closed, and the right front turn lamp 22 is turned on.

When the left-hand turn lamp turn-on signal is not outputted from the first AND logic circuit 305, based on an operation of switching the turn switch 13 to the left or an operation of turning on the hazard switch 16, a signal for flashing the left-hand turn lamps 20, 21, and 21b is outputted from the flasher circuit 301 to the third M relay 311 through the first OR logic circuit 309. Thereby the left front turn lamp 20 flashes on and off.

When the right-hand turn lamp turn-on signal is not outputted from the second AND logic circuit 306, based on an operation of switching the turn switch 13 to the right or the operation of turning on the hazard switch 16, a signal for flashing the right-hand turn lamps 22, 23a, and 23b is outputted from the flasher circuit 301 to the fourth M relay 312 through the second OR logic circuit 310. Thereby the right front turn lamp 22 flashes on and off.

Accordingly, an operation similar to that of the first embodiment is performed in the second embodiment.

In the second embodiment, because the relay of the one-make type is used instead of the relay of the make-and-break type used in the first embodiment, it is possible to reduce the cost for manufacturing the relay means. But the first embodiment is superior to the second embodiment in respect of the heat generation of the control unit 30. More specifically, in the first embodiment, when the daytime turn-on requirement is satisfied, the first and second MB relays 307, 308 operate; when the turn switch 13 is switched to the left (or the right), the first M relay 303 and the second MB relay 308 (or the second M relay 304 and the first MB relay 307) operate; and when the hazard switch 16 is turned on, the first and second M relays 303, 304 operate. That is, at most, two relay means operate. On the other hand, in the second embodiment, when the daytime turn-on requirement is satisfied, the third and fourth M relays 311, 312 operate; when the turn switch 13 is switched to the left (or the right), the first M relay 303, the third M relay 311, and the fourth M relay 312 (or the second M relay 304, the third M relay 311, and the fourth M relay 312) operate; and when the hazard switch 16 is turned on, the first through fourth M relays 303, 304, 311, and 312 operate. That is, more relay means operate in the second embodiment than in the first embodiment.

Other Embodiments

Figure 5:
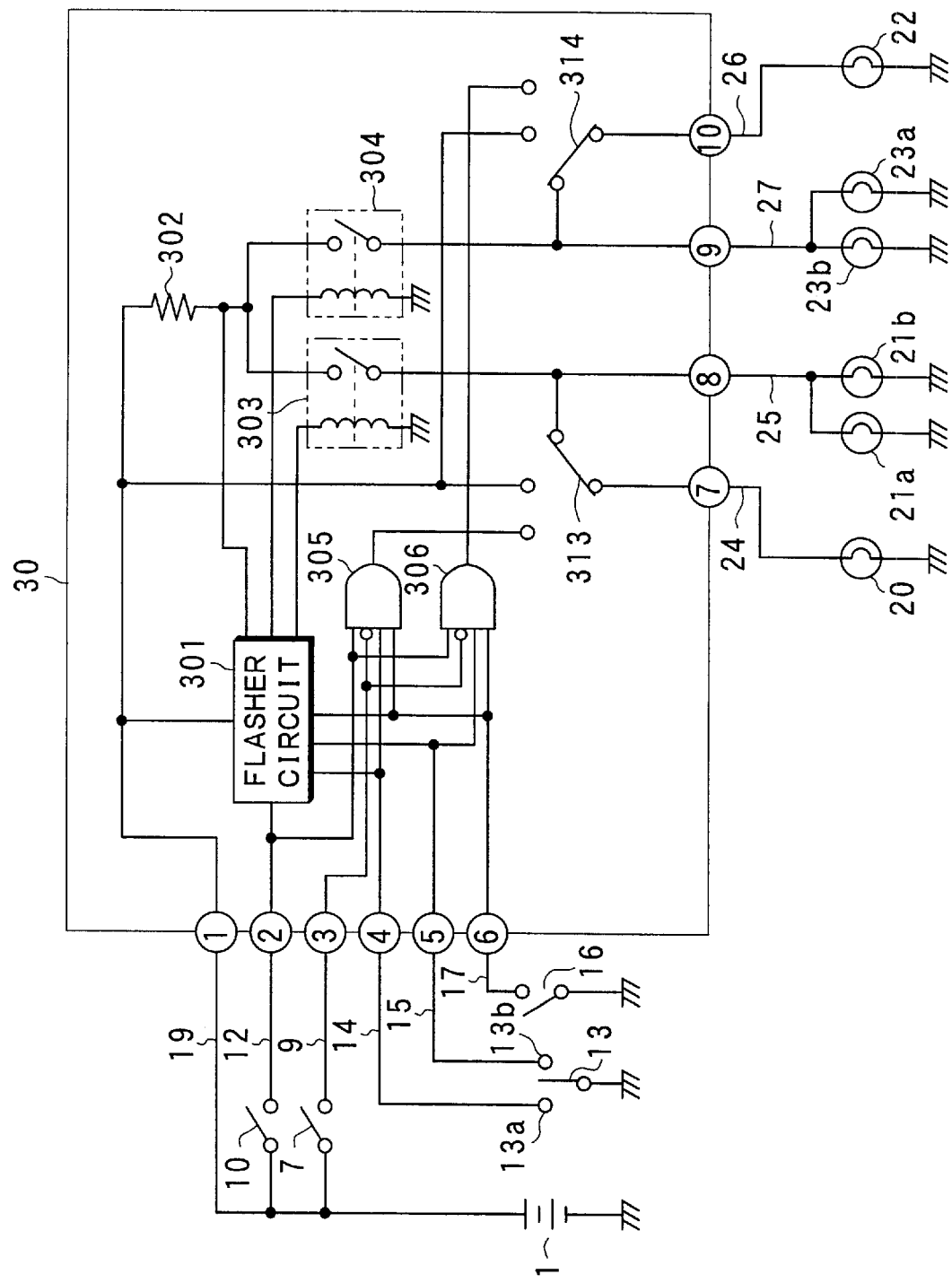
FIG. 5 shows the construction of the control unit 30 in the case where the control unit 30 is mounted on a vehicle not requiring a daytime lighting function.
Figure 6:
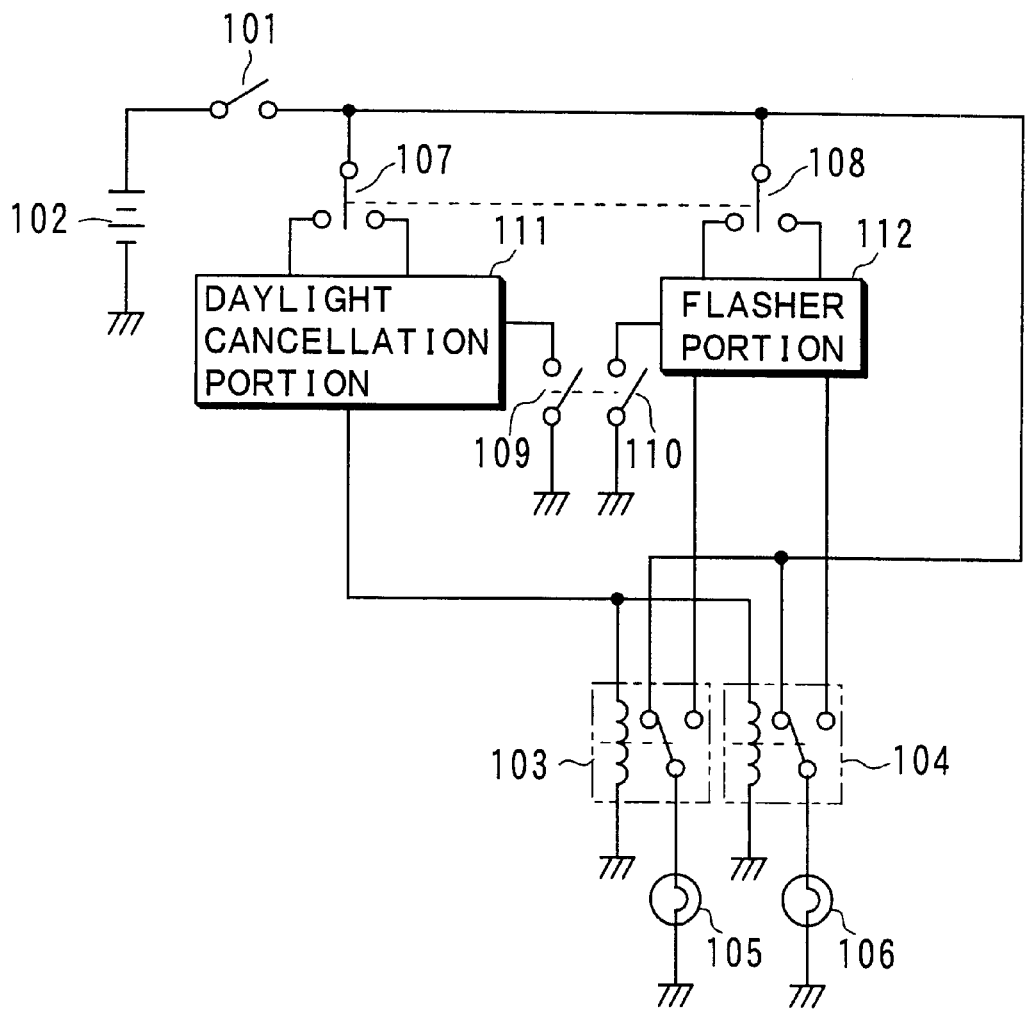
FIG. 6 shows a schematic construction of a conventional direction-indication-lamp control apparatus for a vehicle.

In the first and second embodiments, the control unit 30 having the daytime lighting function is mounted on the vehicle. But some types of vehicles do not require the daytime lighting function. When the control unit 30 of the first embodiment or that of the second embodiment is mounted on these vehicles, as shown in FIG. 5, the first and second MB relays 307, 308 (third and fourth M relays 311, 312 in the second embodiment) are removed, the terminals 7 and 8 are connected to each other with a jumper line 313, and the terminals 9 and 10 are connected to each other with a jumper line 314.

In the first embodiment, the make contact of each of the first and second MB relays 307 and 308 is connected to the electric wire 19. It is necessary to connect the make contact to a line which receives a power supply. Thus, the make contact may be connected to a line via the current detection resistance 302, as carried out in the second embodiment In the first and second embodiments, only the left front turn lamp 20 and the right front turn lamp 22 are turned on in the daytime travel. But it is possible to turn on the left rear turn lamps 21a, 21b and the right rear turn lamps 23a, 23b additionally.

Further, the flasher circuit 301, the first and second AND logic circuits 305, 306 (and first and second OR logic circuits 309, 310) inside the control unit 30 may be composed of a hard logic circuit or a software by suing a computer.

What is claimed is:

1. A direction-indication-lamp control apparatus for a vehicle for turning on a left-hand front turn lamp of said vehicle or a right-hand front turn lamp thereof as a lamp in a daytime travel, comprising:

a first determining means outputting a left-hand turn lamp turn-on signal, when said first determining means determines that a requirement of a daytime travel is satisfied and a requirement of flashing left-hand turn lamps is not satisfied, whereas said first determining means stops outputting said left-hand turn lamp turn-on signal, when said first determining means determines that said requirement of said daytime travel is not satisfied or said requirement of flashing said left-hand turn lamps is satisfied, based on a signal indicating said requirement of said daytime travel and a signal indicating said requirement, of flashing said left-hand turn lamps, including ON of a turn switch turned to the left;

a second determining means outputting a right-hand turn lamp turn-on signal, when said second determining means determines that said requirement of said daytime travel is satisfied and said requirement of flashing right-hand turn lamps is not satisfied, whereas said second determining means stops outputting said right-hand turn lamp turn-on signal, when said second determining means determines that said requirement of said daytime travel is not satisfied or said requirement of flashing said right-hand turn lamps is satisfied, based on a signal indicating said requirement of said daytime travel and a signal indicating said requirement, of flashing said right-hand turn lamps, including ON of said turn switch turned to the right;

a first driving means for turning on said left front turn lamp, based on said left-hand turn. lamp turn-on signal; and a second driving means for turning on said right front turn lamp, based on said right-hand turn lamp turn-on signal.

2. A direction-indication-lamp control apparatus according to claim 1, wherein said signal indicating said requirement of said daytime travel includes a signal outputted from an ignition switch and a signal outputted from a head lamp switch; said signal indicating said requirement of flashing said left-hand turn lamps includes a signal outputted from said turn switch turned to the left and a signal outputted from a hazard switch; and said signal indicating said requirement of flashing said right-hand turn lamps includes a signal outputted from said turn switch turned to the right and a signal outputted from said hazard switch.

3. A direction-indication-lamp control apparatus according to claim 2, wherein said first determining means comprises a first AND logic circuit taking an AND logic of said signal outputted from said ignition switch, said signal outputted from said head lamp switch, said signal outputted from said turn switch turned to the left, and said signal outputted from said hazard switch;

and said second determining means comprises a second AND logic circuit taking an AND logic of said signal outputted from said ignition switch, said signal outputted from said head lamp switch, said signal outputted from said turn switch turned to the right, and said signal outputted from said hazard switch.

4. A direction-indication-lamp control apparatus according to claim 1, further comprising:

a flash control means for outputting a left-hand turn lamp flashing signal and/or a right-hand turn lamp flashing signal, based on said signal outputted from said turn switch turned to the left, said signal outputted from said turn switch turned to the right, and said signal outputted from said hazard switch;

a third driving means for flashing a left rear turn lamp of said vehicle, based on said left-hand turn lamp flashing signal; and a fourth driving means for flashing a right rear turn lamp of said vehicle, based on said right-hand turn lamp flashing signal, wherein said first driving means is configured to flash said left front turn lamp by said third driving means, when said first determining means stops outputting said left-hand turn lamp turn-on signal and when said flash control means outputs said left-hand turn lamp flashing signal, and said second driving means is configured to flash said right front turn lamp by said fourth driving means, when said second determining means stops outputting said right-hand turn lamp turn-on signal and when said flash control means outputs said right-hand turn lamp flashing signal.

5. A direction-indication-lamp control apparatus according to claim 4, wherein each of aid third and fourth driving means comprises a relay.

6. A direction-indication-lamp control apparatus according to claim 5, wherein said first driving means comprises a first relay having a common terminal connected to said left front turn lamp, a break terminal connected to said third driving means, and a make terminal connected to a power supply line extending from a battery mounted on said vehicle; and said second driving means comprises a second relay having a common terminal connected to said right front turn lamp, a break terminal connected to said fourth driving means, and a make terminal connected to a power supply line extending from said battery mounted on said vehicle.

7. A direction-indication-lamp control apparatus according to claim 5, wherein said first driving means includes:

a first OR logic circuit taking an OR logic of a signal outputted from said first determining means and a signal outputted from said flash control means; and a first relay for turning on or flashing said left front turn lamp, based on a signal outputted from said first OR logic circuit;

said second driving means includes:

a second OR logic circuit taking an OR logic of a signal outputted from said second determining means and said signal outputted from said flash control means; and a second relay for turning on or flashing said right front turn lamp, based on a signal outputted from said second OR logic circuit.

8. A direction-indication-lamp control apparatus for a vehicle comprising:

a flash control means for outputting a left-hand turn lamp flashing signal and/or a right-hand turn lamp flashing signal, based on a signal outputted from a turn switch turned to the left, a signal outputted from a turn switch turned to the right, and a signal outputted from a hazard switch;

a first AND logic means outputting a left-hand turn lamp turn-on signal, when a first daytime turn-on requirement is satisfied, i.e., when it is determined that an ignition switch is ON, a head lamp switch is OFF, a turn switch turned to the left is OFF, and a hazard switch is OFF and stopping outputting said left-hand turn lamp turn-on signal, when said first daytime turn-on requirement is not satisfied, by taking an AND logic of a signal outputted from said ignition switch, a signal outputted from said head lamp switch, a signal outputted from said turn switch turned to the left, and a signal outputted from said hazard switch;

a second AND logic means outputting a right-hand turn lamp turn-on signal, when a second daytime turn-on requirement is satisfied, i.e., when it is determined that said ignition switch is ON,.said head lamp switch is OFF, said turn switch turned to the right is OFF, and said hazard switch is OFF and stopping outputting said right-hand turn lamp turn-on signal, when said second daytime turn-on requirement is not satisfied, by taking an AND logic of said signal outputted from said ignition switch, said signal outputted from said head lamp switch, a signal outputted from said turn switch turned to the right, and said signal outputted from said hazard switch;

a first relay means for flashing a left front turn lamp of said vehicle and a left rear turn lamp thereof, based on said left-hand turn lamp flashing signal;

a second relay means for flashing a right front turn lamp of said vehicle and a right rear turn lamp thereof, based on said right-hand turn lamp flashing signal;

a third relay means having a common terminal connected to said left front turn lamp, a break terminal connected to said first relay means, and a make terminal connected to a power supply line extending from a battery mounted on said vehicle and connecting said common terminal to said make terminal to turn on said left front turn lamp, based on said left-hand turn lamp turn-on signal; and a fourth relay means having a common terminal connected to said right front turn lamp, a break terminal connected to said second relay means, and a make terminal connected to said power supply line and connecting said common terminal to said make terminal to turn on said right front turn lamp, based on said right-hand turn lamp turn-on signal.

9. A direction-indication-lamp control apparatus for a vehicle comprising:

a flash control means for outputting a left-hand turn lamp flashing signal and/or a right-hand turn lamp flashing signal, based on a signal outputted from a turn switch turned to the left, a signal outputted from a turn switch turned to the right, and a signal outputted from a hazard switch;

a first AND logic means outputting a left-hand turn lamp turn-on signal, when a first daytime turn-on requirement is satisfied, i.e., when it is determined that an ignition switch is ON, a head lamp switch is OFF, a turn switch turned to the left is OFF, and a hazard switch is OFF and stopping outputting said left-hand turn lamp turn-on signal, when said first daytime turn-on requirement is not satisfied, by taking an AND logic of a signal outputted from said ignition switch, a signal outputted from said head lamp switch, a signal outputted from said turn switch turned to the left, and a signal outputted from said hazard switch;

a second AND logic means outputting a right-hand turn lamp turn-on signal, when a second daytime turn-on requirement is satisfied, i.e., when it is determined that said ignition switch is ON, said head lamp switch is OFF, said turn switch turned to the right is OFF, and said hazard switch is OFF and stopping outputting said right-hand turn lamp turn-on signal, when said second daytime turn-on requirement is not satisfied, by taking an AND logic of said signal outputted from said ignition switch, said signal outputted from said head lamp switch, a signal outputted from said turn switch turned to the right, and said signal outputted from said hazard switch;

a first OR logic means of taking an OR logic of said left-hand turn lamp turn-on signal and said left-hand turn lamp flashing signal;

a second logic means of taking an OR logic of said right-hand turn lamp turn-on signal and said right-hand turn lamp flashing signal;

a first relay means for flashing a left rear turn lamp of said vehicle, based on said left-hand turn lamp flashing signal;

a second relay means for flashing a right rear turn lamp of said vehicle, based on said right-hand turn lamp flashing signal;

a third relay means for turning on or flashing said left front turn lamp, based on said left-hand turn lamp turn-on signal or said left-hand turn lamp flashing signal outputted from said first OR logic means; and a fourth relay means for turning on or flashing said a right front turn lamp, based on said right-hand turn lamp turn-on signal or said right-hand turn lamp flashing signal outputted from said second OR logic means.

* * * * *